(12) United States Patent
Cho et al.

(10) Patent No.: US 12,508,873 B2
(45) Date of Patent: Dec. 30, 2025

(54) HEAT PUMP SYSTEM OF VEHICLE

(71) Applicants: Hyundai Motor Company, Seoul (KR); Kia Corporation, Seoul (KR)

(72) Inventors: Wan Je Cho, Hwaseong-si (KR); Yeonho Kim, Seoul (KR); Jae Yeon Kim, Hwaseong-si (KR); Seong-Bin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 362 days.

(21) Appl. No.: 18/295,908

(22) Filed: Apr. 5, 2023

(65) Prior Publication Data

US 2024/0181843 A1     Jun. 6, 2024

(30) Foreign Application Priority Data

Dec. 5, 2022    (KR) .................... 10-2022-0167503

(51) Int. Cl.
*B60H 1/00*    (2006.01)
*B60H 1/22*    (2006.01)
*B60H 1/32*    (2006.01)

(52) U.S. Cl.
CPC .......... *B60H 1/00899* (2013.01); *B60H 1/00* (2013.01); *B60H 1/00278* (2013.01);
(Continued)

(58) Field of Classification Search
CPC ............ B60H 1/00885; B60H 1/00278; B60H 1/00485; B60H 1/00921;
(Continued)

(56) References Cited

U.S. PATENT DOCUMENTS

| 4,086,072 A * | 4/1978 | Shaw ................. F04C 18/16 62/235.1 |
| 6,059,016 A * | 5/2000 | Rafalovich ............. F28D 20/02 165/41 |

(Continued)

FOREIGN PATENT DOCUMENTS

| CN | 104470747 B * | 8/2017 | ............ B60L 3/0023 |
| EP | 4385775 A1 * | 6/2024 | .......... H01M 10/613 |

(Continued)

*Primary Examiner* — Ljiljana V. Ciric
(74) *Attorney, Agent, or Firm* — Slater Matsil, LLP

(57) ABSTRACT

An embodiment heat pump system of a vehicle includes a first cooling device including an electrical component and a first line for circulating a coolant, a second cooling device including a battery module and a second line for circulating the coolant, a HVAC module connected through a refrigerant line and internally provided with an opening/closing door that adjusts a selective flow of ambient air according to a cooling, heating, or heating and dehumidifying mode of a vehicle interior, a heat-exchanger connected to the internal condenser through the refrigerant line, a first expansion valve on the refrigerant line and connecting the heat-exchanger and the evaporator, a compressor connected between the evaporator and the internal condenser through the refrigerant line, an accumulator on the refrigerant line between the evaporator and the compressor, a chiller, a second expansion valve, a third expansion valve, and a second connection line.

20 Claims, 5 Drawing Sheets

(52) U.S. Cl.
CPC ........... *B60H 1/00921* (2013.01); *B60H 1/22* (2013.01); *B60H 1/3228* (2019.05); *B60H 2001/00307* (2013.01); *B60H 2001/00928* (2013.01)

(58) Field of Classification Search
CPC ........... B60H 2001/00307; B60H 2001/00928; B60H 1/2221; B60H 1/3213; B60H 1/00899; B60H 1/00; B60H 1/22; B60H 1/3228; B60H 1/32281; B60H 1/143; B60Y 2200/91; F25B 41/20; F25B 41/31; F25B 41/42

See application file for complete search history.

(56) References Cited

U.S. PATENT DOCUMENTS

| | | | | |
|---|---|---|---|---|
| 6,124,644 | A * | 9/2000 | Olson | B60L 3/0023 180/65.245 |
| 6,347,528 | B1 * | 2/2002 | Iritani | B60H 1/3207 62/434 |
| 6,464,027 | B1 * | 10/2002 | Dage | F01P 3/20 123/41.14 |
| 6,569,550 | B2 * | 5/2003 | Khelifa | B60H 1/323 429/434 |
| 6,915,649 | B2 * | 7/2005 | Amaral | B60H 1/00907 62/434 |
| 7,380,586 | B2 * | 6/2008 | Gawthrop | B60H 1/004 62/3.61 |
| 7,789,176 | B2 * | 9/2010 | Zhou | B60H 1/00885 180/65.1 |
| 7,841,431 | B2 * | 11/2010 | Zhou | B60L 58/26 180/65.1 |
| 8,910,489 | B2 * | 12/2014 | Choi | B60H 1/143 62/185 |
| 9,731,578 | B2 * | 8/2017 | Johnston | H01M 10/663 |
| 9,895,956 | B2 * | 2/2018 | Satou | F25B 5/02 |
| 9,944,152 | B2 * | 4/2018 | Kim | B60H 1/00428 |
| 10,183,544 | B2 * | 1/2019 | Kim | F25B 25/005 |
| 10,183,549 | B2 * | 1/2019 | Koberstein | B60H 1/00385 |
| 10,252,599 | B2 * | 4/2019 | Kim | B60H 1/00667 |
| 10,343,483 | B2 * | 7/2019 | Kim | B60H 1/00278 |
| 10,384,512 | B2 * | 8/2019 | Park | B60H 1/2221 |
| 10,486,493 | B2 * | 11/2019 | Kim | B60H 1/32284 |
| 10,625,563 | B2 * | 4/2020 | Kim | B60H 1/00885 |
| 10,677,500 | B2 * | 6/2020 | Kim | F25B 25/005 |
| 10,967,702 | B2 * | 4/2021 | Mancini | B60H 1/00564 |
| 10,974,566 | B2 * | 4/2021 | Kim | B60H 1/00921 |
| 11,007,850 | B2 * | 5/2021 | Kim | B60H 1/00921 |
| 11,046,148 | B2 * | 6/2021 | Kim | B60H 1/034 |
| 11,065,934 | B2 * | 7/2021 | Lee | B60H 1/00328 |
| 11,072,259 | B2 * | 7/2021 | Gonze | B60H 1/00385 |
| 11,110,808 | B2 * | 9/2021 | Lee | B60H 1/00 |
| 11,142,037 | B2 * | 10/2021 | Kim | B60H 1/143 |
| 11,155,138 | B2 * | 10/2021 | Kim | B60H 1/00428 |
| 11,186,137 | B2 * | 11/2021 | Kim | B60H 1/32284 |
| 11,207,939 | B2 * | 12/2021 | Johnston | B60H 1/143 |
| 11,207,941 | B2 * | 12/2021 | Lee | B60H 1/00385 |
| 11,214,116 | B2 * | 1/2022 | Kim | B60H 1/143 |
| 11,305,607 | B2 * | 4/2022 | Kim | H01M 10/61 |
| 11,318,816 | B2 * | 5/2022 | Kim | B60H 1/3213 |
| 11,325,444 | B2 * | 5/2022 | Kim | B60H 1/3227 |
| 11,390,141 | B2 * | 7/2022 | Kim | B60H 1/00885 |
| 11,394,063 | B2 * | 7/2022 | Bae | H01M 10/625 |
| 11,407,273 | B2 * | 8/2022 | Kim | B60H 1/00271 |
| 11,446,979 | B2 * | 9/2022 | He | B60H 1/00899 |
| 11,458,811 | B2 * | 10/2022 | Kim | B60H 1/32284 |
| 11,458,812 | B2 * | 10/2022 | Jeong | B60H 1/00921 |
| 11,479,076 | B2 * | 10/2022 | Kim | B60H 1/143 |
| 11,479,077 | B2 * | 10/2022 | Kim | B60H 1/32284 |
| 11,505,034 | B2 * | 11/2022 | Kim | B60H 1/00278 |
| 11,505,038 | B2 * | 11/2022 | Kim | B60H 1/00899 |
| 11,506,306 | B2 * | 11/2022 | Schoeneman | F16K 49/005 |
| 11,571,948 | B2 * | 2/2023 | Kim | B60H 1/32284 |
| 11,602,977 | B2 * | 3/2023 | Kim | B60H 1/3227 |
| 11,613,164 | B2 * | 3/2023 | Kim | B60H 1/00278 62/185 |
| 11,760,153 | B2 * | 9/2023 | Kim | B60H 1/00921 165/41 |
| 11,766,920 | B2 * | 9/2023 | Turudic | B60H 1/00385 165/201 |
| 11,794,550 | B2 * | 10/2023 | Kim | B60H 1/00278 |
| 11,807,066 | B2 * | 11/2023 | Hwang | B60H 1/00878 |
| 11,870,045 | B2 * | 1/2024 | Kim | H01M 10/6569 |
| 11,898,657 | B2 * | 2/2024 | Schoeneman | F01P 7/165 |
| 12,059,943 | B2 * | 8/2024 | Jeong | B60H 1/00485 |
| 12,061,031 | B2 * | 8/2024 | Lee | B60H 1/00392 |
| 12,083,856 | B2 * | 9/2024 | He | B60H 1/00485 |
| 12,083,861 | B2 * | 9/2024 | Kim | B60H 1/00921 |
| 12,090,816 | B2 * | 9/2024 | Kim | B60H 1/00328 |
| 12,097,754 | B2 * | 9/2024 | Hwang | B60H 1/3229 |
| 12,115,839 | B2 * | 10/2024 | Kim | B60H 1/00271 |
| 12,122,213 | B2 * | 10/2024 | He | B60H 1/00278 |
| 12,122,218 | B2 * | 10/2024 | You | B60H 1/00485 |
| 12,128,736 | B2 * | 10/2024 | Cho | B60H 1/00278 |
| 12,172,493 | B2 * | 12/2024 | Jeong | B60H 1/00385 |
| 12,214,644 | B2 * | 2/2025 | Heyl | F25B 9/008 |
| 12,220,966 | B2 * | 2/2025 | Kim | B60H 1/143 |
| 12,227,055 | B2 * | 2/2025 | Jeong | B60H 1/00278 |
| 12,233,686 | B2 * | 2/2025 | Jeong | B60H 1/32284 |
| 12,240,291 | B2 * | 3/2025 | Lee | B60H 1/00899 |
| 12,269,312 | B2 * | 4/2025 | Lee | B60H 1/32 |
| 12,280,633 | B2 * | 4/2025 | Jeong | B60H 3/024 |
| 12,311,739 | B2 * | 5/2025 | Kim | B60H 1/32284 |
| 12,313,304 | B2 * | 5/2025 | Munk | F25B 13/00 |
| 12,370,865 | B2 * | 7/2025 | Cho | B60H 1/00278 |
| 12,370,866 | B2 * | 7/2025 | Jeong | B60H 1/00899 |
| 2013/0283838 | A1 * | 10/2013 | Kadle | F28D 9/0093 62/509 |
| 2014/0069123 | A1 * | 3/2014 | Kim | B60H 1/00921 165/59 |
| 2014/0260392 | A1 * | 9/2014 | Hawkins | F24D 17/02 62/238.6 |
| 2015/0273976 | A1 * | 10/2015 | Enomoto | B60L 3/0046 62/243 |
| 2015/0285539 | A1 * | 10/2015 | Kopko | F25B 41/39 62/324.1 |
| 2016/0031288 | A1 * | 2/2016 | Nishikawa | B60L 58/26 165/43 |
| 2016/0082805 | A1 * | 3/2016 | Graaf | B60H 1/04 62/238.7 |
| 2016/0107508 | A1 * | 4/2016 | Johnston | B60H 1/00278 237/12.3 A |
| 2016/0153343 | A1 * | 6/2016 | Kakehashi | B60K 11/02 123/41.31 |
| 2016/0332505 | A1 * | 11/2016 | Yamanaka | B60H 1/143 |
| 2018/0086224 | A1 * | 3/2018 | King | H01M 10/663 |
| 2018/0208014 | A1 * | 7/2018 | Ben Ahmed | B60H 1/3211 |
| 2019/0152343 | A1 * | 5/2019 | Onozawa | F01P 7/14 |
| 2019/0366800 | A1 * | 12/2019 | Durrani | B60H 1/00907 |
| 2020/0220236 | A1 * | 7/2020 | Durrani | H01M 10/667 |
| 2020/0361280 | A1 * | 11/2020 | Hashimoto | B60H 1/00885 |
| 2021/0001688 | A1 * | 1/2021 | Kim | B60H 1/00921 |
| 2021/0039474 | A1 * | 2/2021 | Kim | B60H 1/3223 |
| 2021/0370747 | A1 * | 12/2021 | Lee | F25B 41/24 |
| 2022/0097487 | A1 * | 3/2022 | Jin | H01M 10/6568 |
| 2022/0258558 | A1 * | 8/2022 | Lee | B60H 1/00921 |
| 2022/0266651 | A1 * | 8/2022 | Jeong | B60H 1/2221 |
| 2022/0349627 | A1 * | 11/2022 | Lee | F25B 5/04 |
| 2022/0355645 | A1 * | 11/2022 | Jeong | B60H 1/00664 |
| 2022/0379681 | A1 * | 12/2022 | Kim | B60H 1/00485 |
| 2023/0173883 | A1 * | 6/2023 | Jeong | B60H 3/024 |
| 2023/0302872 | A1 * | 9/2023 | Lee | B60H 1/3223 |
| 2023/0415539 | A1 * | 12/2023 | Kim | B60H 1/32284 |
| 2024/0174053 | A1 * | 5/2024 | Kim | B60H 1/00921 |
| 2024/0181843 | A1 * | 6/2024 | Cho | B60H 1/00899 |
| 2024/0190210 | A1 * | 6/2024 | Michikawauchi | B60H 1/32284 |
| 2024/0375484 | A1 * | 11/2024 | Lee | B60H 1/00485 |
| 2025/0058603 | A1 * | 2/2025 | Jeong | F25B 9/008 |
| 2025/0074139 | A1 * | 3/2025 | Jeong | B60H 1/00278 |
| 2025/0074157 | A1 * | 3/2025 | Jeong | H01M 10/63 |

(56) References Cited

U.S. PATENT DOCUMENTS

| | | | |
|---|---|---|---|
| 2025/0128570 A1* | 4/2025 | Kim | B60H 1/00885 |
| 2025/0222743 A1* | 7/2025 | Kim | B60H 1/00278 |
| 2025/0301613 A1* | 9/2025 | Miyoshi | H05K 7/20327 |

FOREIGN PATENT DOCUMENTS

| | | | | | |
|---|---|---|---|---|---|
| JP | 2019100688 | A | * | 6/2019 | B60H 1/32 |
| KR | 20220043382 | A | * | 4/2022 | B60H 1/00278 |
| KR | 20240012157 | A | * | 1/2024 | B60H 1/00485 |
| KR | 102703181 | B1 | * | 9/2024 | B60H 1/00392 |
| WO | WO-2013190767 | A1 | * | 12/2013 | B60H 1/00278 |

* cited by examiner

HEAT PUMP SYSTEM OF VEHICLE

CROSS-REFERENCE TO RELATED APPLICATIONS

This application claims the benefit of Korean Patent Application No. 10-2022-0167503, filed on Dec. 5, 2022, which application is hereby incorporated herein by reference.

TECHNICAL FIELD

The present disclosure relates to a heat pump system of a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, a cooling system, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling system, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may be introduced into the vehicle interior, thereby deteriorating the ride comfort.

In addition, when heating the vehicle interior, the heating performance may be deteriorated due to the lack of a heat source, the electricity consumption may be increased due to the usage of the electric heater, and the power consumption of the compressor may be increased.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a heat pump system of a vehicle. Particular embodiments relate to a heat pump system of a vehicle capable of adjusting the temperature of the battery module by using a single chiller providing heat-exchange between the refrigerant and the coolant and improving the heating efficiency by using waste heat generated by an ambient air heat source and an electrical component.

Embodiments of the present disclosure provide a heat pump system of a vehicle capable of adjusting the temperature of the battery module by using a single chiller providing heat-exchange between the refrigerant and the coolant and improving the heating efficiency by recollecting the waste heat generated by an ambient air heat source and an electrical component and using it for heating of the vehicle interior.

A heat pump system of a vehicle may include a first cooling device including an electrical component and a first line through which a coolant circulates, a second cooling device including a battery module and a second line through which the coolant circulates, a HVAC module connected through a refrigerant line and internally provided with an opening/closing door configured to adjust selective flowing of an ambient air having passed through an evaporator to an internal condenser according to a cooling mode, a heating mode, and a heating and dehumidifying mode of a vehicle interior, a heat-exchanger connected to the internal condenser through the refrigerant line, a first expansion valve provided on the refrigerant line connecting the heat-exchanger and the evaporator, a compressor connected between the evaporator and the internal condenser through the refrigerant line, an accumulator provided on the refrigerant line between the evaporator and the compressor, a chiller connected to the first and second cooling devices through the first and second lines, respectively, connected to the refrigerant line through a first connection line, and configured to adjust the temperature of the coolant by heat-exchanging a selectively introduced coolant with the refrigerant supplied from the first connection line, a second expansion valve provided on the first connection line upstream of the chiller, a third expansion valve provided on the refrigerant line between the internal condenser and the heat-exchanger, and a second connection line having a first end connected to the second expansion valve and a second end connected to the refrigerant line between the internal condenser and the third expansion valve.

A first end of the first connection line may be connected to the refrigerant line between the heat-exchanger and the first expansion valve and a second end of the first connection line may be connected to the refrigerant line between the accumulator and the evaporator.

For cooling the battery module by using the coolant having heat-exchanged at the chiller, the second expansion valve may be configured to expand the refrigerant introduced through the first connection line and introduce the expanded refrigerant to the chiller.

For preventing frosting at the heat-exchanger in the heating mode of the vehicle interior or in the heating and dehumidifying mode of the vehicle interior, the second connection line may be opened by an operation of the second expansion valve.

For preventing frosting at the heat-exchanger in the heating mode of the vehicle interior or in the heating and dehumidifying mode of the vehicle interior, the second expansion valve may be configured to close a portion of the first connection line connected to the refrigerant line connecting the heat-exchanger and the first expansion valve, open the second connection line, and expand the refrigerant introduced through the second connection line to introduce the expanded refrigerant to the chiller.

In the cooling mode of the vehicle interior, the third expansion valve may be configured to introduce the refrigerant supplied from the internal condenser to the refrigerant line without expansion.

A heat pump system may further include a dehumidification line having a first end connected to the third expansion valve and a second end connected to the refrigerant line between the first expansion valve and the evaporator.

The dehumidification line may be closed by an operation of the third expansion valve in the cooling mode or the heating mode of the vehicle interior, and the dehumidification line may be opened by the operation of the third expansion valve in the heating and dehumidifying mode of the vehicle interior.

In the heating and dehumidifying mode of the vehicle interior, the third expansion valve may be configured to close the refrigerant line connected to the heat-exchanger and open the dehumidification line such that an expanded refrigerant may be introduced to the dehumidification line.

In the heating and dehumidifying mode of the vehicle interior, the electrical component and the chiller may be connected through the first line by an operation of the first cooling device, the refrigerant line connecting the heat-exchanger and the first expansion valve may be closed by an operation of the first expansion valve, a portion of the first connection line connected to the refrigerant line connecting the heat-exchanger and the first expansion valve may be closed by an operation of the second expansion valve, the refrigerant line connecting the heat-exchanger and the third expansion valve may be closed by an operation of the third expansion valve, the second connection line may be opened by the operation of the second expansion valve, the dehumidification line may be opened by the operation of the third expansion valve, the refrigerant may circulate along the refrigerant line opened by an operation of the compressor, and the second expansion valve and the third expansion valve may expand the refrigerant, respectively.

For cooling the battery module in the cooling mode of the vehicle interior, the battery module and the chiller may be connected through the second line by an operation of the second cooling device, the first connection line may be opened by an operation of the second expansion valve, the second connection line may be closed by the operation of the second expansion valve, the refrigerant may circulate along the refrigerant line by an operation of the compressor, the second expansion valve may expand the refrigerant introduced through the first connection line such that the expanded refrigerant may be supplied to the chiller, the third expansion valve may allow the refrigerant supplied from the internal condenser to pass through, and the heat-exchanger may condense the supplied refrigerant through heat-exchange with the ambient air.

For recollecting waste heat of an ambient air heat source and the electrical component in the heating mode of the vehicle interior, the electrical component and the chiller may be connected through the first line by an operation of the first cooling device, a portion of the refrigerant line from a location connected to the first connection line to a location connected to the evaporator may be closed by an operation of the first expansion valve, the first connection line may be opened by an operation of the second expansion valve, the second connection line may be closed by the operation of the second expansion valve, the refrigerant may circulate along the refrigerant line opened by an operation of the compressor, the second expansion valve may allow the refrigerant introduced through the first connection line to pass through, the third expansion valve may expand the refrigerant supplied from the internal condenser such that the expanded refrigerant is supplied to the heat-exchanger through the refrigerant line, and the heat-exchanger may evaporate the supplied refrigerant through heat-exchange with the ambient air.

For preventing frosting at the heat-exchanger in the heating mode of the vehicle interior, the electrical component and the chiller may be connected through the first line by an operation of the first cooling device, the refrigerant line connecting the heat-exchanger and the first expansion valve may be closed by an operation of the first expansion valve, a portion of the first connection line connected to the refrigerant line connecting the heat-exchanger and the first expansion valve may be closed by an operation of the second expansion valve, the second connection line may be opened by the operation of the second expansion valve, the refrigerant line between the heat-exchanger and the third expansion valve may be closed by the third expansion valve, the refrigerant may circulate along the refrigerant line opened by an operation of the compressor, the second expansion valve may expand the refrigerant introduced through the second connection line and introduce the expanded refrigerant to the chiller, and an operation of the third expansion valve may be stopped.

The second and the third expansion valves each may be a 3-way electronic expansion valve configured to selectively expand the refrigerant while controlling flowing of the refrigerant, respectively.

The heat-exchanger may be configured to condense or evaporate an interiorly introduced refrigerant through heat-exchange with the ambient air according to a selective operation of the third expansion valve.

The chiller may be a water-cooled heat-exchanger, and the heat-exchanger may be an air-cooled heat-exchanger.

According to a heat pump system of a vehicle according to an embodiment, the temperature of the battery module may be adjusted according to a vehicle mode by using a single chiller providing heat-exchange between the coolant and the refrigerant, and the waste heat generated by an ambient air heat source and an electrical component may be recollected and used for heating of the vehicle interior, thereby improving the overall efficiency of the system.

In addition, a single heat-exchanger that condenses or evaporates the refrigerant through heat-exchange with the ambient air according to the cooling mode or the heating mode of the vehicle is employed, and frost accumulation on the heat-exchanger due to frosting and freezing according to the ambient air temperature is prevented. Accordingly, streamlining and simplification of the system may be achieved and marketability may be improved.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, condensation or evaporation performance of the refrigerant is improved by employing the heat-exchanger that condenses or evaporates the refrigerant through heat-exchange with ambient air, and therefore, the cooling performance may be improved while the power consumption of the compressor is decreased.

In addition, according to an embodiment, it is possible to reduce manufacturing cost and weight through simplification of an entire system and to improve space utilization.

Figure 1:
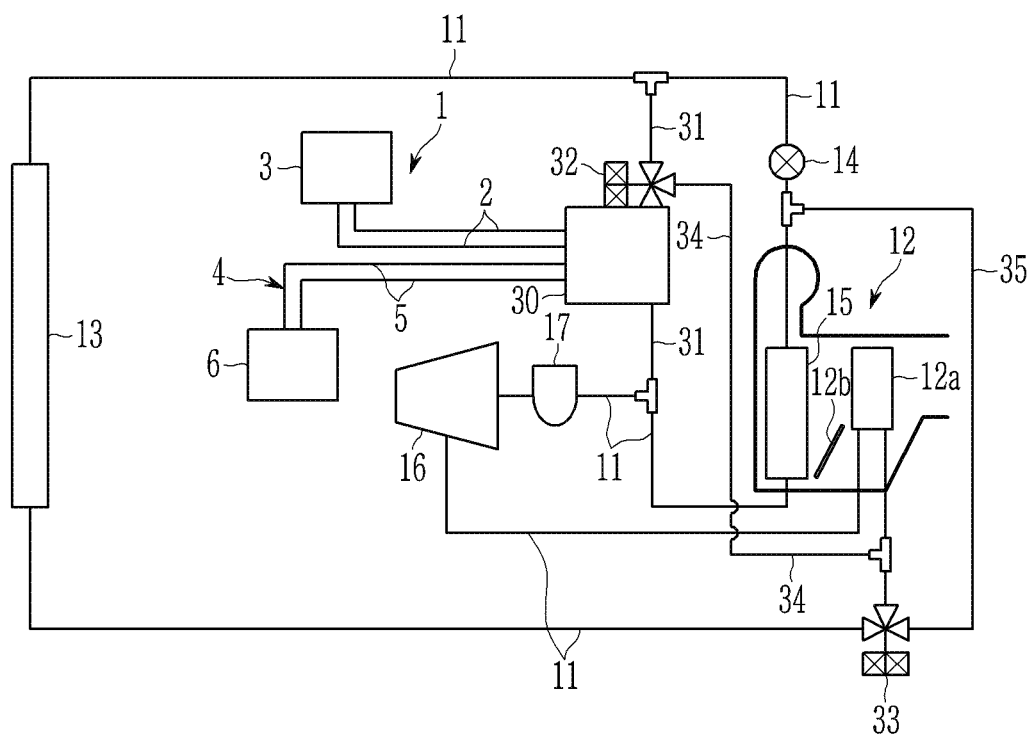
FIG. 1 is a block diagram of a heat pump system of a vehicle according to an embodiment.

The following reference identifiers may be used in connection with the accompanying drawings to describe exemplary embodiments of the present disclosure.

1, 4: first and second cooling devices
3: electrical component
2, 5: first and second line
6: battery module
11: refrigerant line
12: HVAC module
12a: internal condenser
12b: opening/closing door
13: heat-exchanger
14: first expansion valve
15: evaporator
16: compressor
17: accumulator
31: first connection line
32: second expansion valve
33: second expansion valve
34: second connection line
35: dehumidification line

DETAILED DESCRIPTION OF ILLUSTRATIVE EMBODIMENTS

Exemplary embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc. are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . portions," " . . . part," and " . . . member" described in the specification, mean a unit of a comprehensive element that performs at least one function or operation.

FIG. 1 is a block diagram of a heat pump system of a vehicle according to an embodiment.

A heat pump system of a vehicle according to an embodiment is configured to efficiently adjust the temperature of a battery module 6 by using a chiller 30 providing heat-exchange between a refrigerant and a coolant and to improve the heating efficiency by using waste heat generated by an ambient air heat source and an electrical component 3.

Here, in the heat pump system, e.g., in an electric vehicle, a first cooling device 1 and a second cooling device 4 for supplying the coolant to the electrical component 3 and the battery module 6 may be interconnected with component parts for circulating the refrigerant for cooling and heating of a vehicle interior.

That is, referring to FIG. 1, the heat pump system may include the first cooling device 1, the second cooling device 4, a HVAC (heating, ventilation, and air conditioning) module 12, a heat-exchanger 13, a first expansion valve 14, an evaporator 15, a compressor 16, the chiller 30, a first connection line 31, a second expansion valve 32, a third expansion valve 33, and a second connection line 34.

First, the first cooling device 1 may include the electrical component 3 and a first line 2 through which the coolant circulates. The electrical component 3 may be connected to the first line 2 such that the coolant may flow through the electrical component 3.

The electrical component 3 may include an autonomous driving controller and power conversion device such as an electric power control unit (EPCU), a motor, an inverter, an on-board charger (OBC), or the like.

The electrical component 3 may be water-cooled by being connected to the first line 2.

The second cooling device 4 may include a second line 5 and the battery module 6. The battery module 6 may be connected to the second line 5 such that the coolant may flow through the battery module 6.

Accordingly, the battery module 6 may be water-cooled by being connected to the second line 5.

Here, the first and second cooling devices 1 and 4 may include a radiator, a water pump, a reservoir tank, and the like (not shown).

That is, the first and second cooling devices 1 and 4 circulate the coolant along the first and second lines 2 and 5 by the operation of the water pump, respectively, and may thereby adjust the temperature of the electrical component 3 and the battery module 6.

In the present embodiment, the HVAC module 12 is internally provided with the evaporator 15 and an opening/closing door 12b, where the evaporator 15 is connected to the refrigerant line 11, and the opening/closing door 12b is configured to adjust selective flowing of the ambient air having passed through the evaporator 15 to an internal condenser 12a according to the cooling mode, the heating mode, and the heating and dehumidifying mode of the vehicle interior.

That is, in the heating mode or the heating and dehumidifying mode of the vehicle interior, the opening/closing door 12b is opened such that the ambient air having passed through the evaporator 15 is introduced to the internal condenser 12a.

To the contrary, in the cooling mode of the vehicle interior, the opening/closing door 12b closes a side to the internal condenser 12a such that the ambient air cooled while passing through the evaporator 15 may be directly introduced to the vehicle interior.

The internal condenser 12a may condense the refrigerant supplied from the compressor 16 through heat-exchange with ambient air.

The heat-exchanger 13 is connected to the internal condenser 12a through the refrigerant line 11. The heat-exchanger 13 may be disposed at a front of the vehicle.

Here, the heat-exchanger 13 may condense or evaporate an interiorly introduced refrigerant through heat-exchange with ambient air according to a selective operation of the third expansion valve 33.

That is, the heat-exchanger 13 is an air-cooled heat-exchanger configured to heat-exchange the introduced refrigerant with the ambient air.

The first expansion valve 14 is provided on the refrigerant line 11 connecting the heat-exchanger 13 and the evaporator 15. The first expansion valve 14 receives and expands the refrigerant having passed through the heat-exchanger 13.

In the present embodiment, the compressor 16 is connected between the evaporator 15 and the internal condenser 12a through the refrigerant line 11. The compressor 16 may compress the refrigerant in the gas state and supply the compressed refrigerant to the internal condenser 12a.

The accumulator 17 is provided on the refrigerant line 11 between the evaporator 15 and the compressor 16.

The accumulator 17 only supplies the refrigerant in the gas state to the compressor 16, and thereby efficiency and durability of the compressor 16 is improved.

In the present embodiment, the chiller 30 is connected to the first cooling device 1 through the first line 2 and is respectively connected to the second cooling device 4 through the second line 5.

Accordingly, the chiller 30 is connected through the first line 2 or the second line 5, and the coolant may selectively circulate therethrough.

The chiller 30 is connected to the refrigerant line 11 through the first connection line 31. That is, the chiller 30 may be a water-cooled heat-exchanger through which the coolant may flow.

The chiller 30 may adjust the temperature of the coolant by heat-exchanging the coolant selectively introduced through the first line 2 or the second line 5 with the refrigerant selectively supplied through the first connection line 31.

The coolant having heat-exchanged at the chiller 30 may circulate the electrical component 3 through the first line 2 or circulate the battery module 6 through the second line 5.

The second expansion valve 32 is provided on the first connection line 31 upstream of the chiller 30.

Here, a first end of the first connection line 31 is connected to the refrigerant line 11 between the heat-exchanger 13 and the first expansion valve 14. In addition, a second end of the first connection line 31 may be connected to the refrigerant line 11 between the evaporator 15 and the accumulator 17.

Meanwhile, according to the cooling mode, the heating mode, or the heating and dehumidifying mode of the vehicle interior, the second expansion valve 32 may selectively expand the refrigerant having passed through the heat-exchanger 13 and introduce the expanded refrigerant through the first connection line 31 or may pass the refrigerant to the first connection line 31 without expansion.

In more detail, for cooling the battery module 6 by using the coolant having heat-exchanged at the chiller 30, the second expansion valve 32 may expand the refrigerant introduced through the first connection line 31 and introduce the expanded refrigerant to the chiller 30.

That is, the second expansion valve 32 decreases the temperature by expanding the refrigerant discharged from the heat-exchanger 13 and introduces the refrigerant of the decreased temperature to the chiller 30, thereby further decreasing the temperature of the coolant passing through the chiller 30.

Accordingly, the battery module 6 receives the coolant with the decreased temperature by passing through the chiller 30 and may be more efficiently cooled.

In the present embodiment, the third expansion valve 33 may be provided on the refrigerant line 11 between the internal condenser 12a and the heat-exchanger 13.

Here, in the case of the cooling mode of the vehicle interior, the third expansion valve 33 may introduce the refrigerant supplied from the internal condenser 12a to the refrigerant line 11 in an unexpanded state.

To the contrary, in the heating mode or the heating and dehumidifying mode of the vehicle interior, the third expansion valve 33 may expand the refrigerant introduced through the refrigerant line 11 and supply the expanded refrigerant to the heat-exchanger 13.

Accordingly, in the heating mode or the heating and dehumidifying mode of the vehicle interior, the heat-exchanger 13 may evaporate the refrigerant through heat-exchange with the coolant supplied through the second line 5.

Here, the heat-exchanger 13 may condense or evaporate an interiorly introduced refrigerant through heat-exchange with ambient air according to the selective operation of the third expansion valve 33.

In the present embodiment, a first end of the second connection line 34 is connected to the second expansion valve 32. A second end of the second connection line 34 may be connected to the refrigerant line 11 between the internal condenser 12a and the third expansion valve 33.

Here, in the case of preventing frosting at the heat-exchanger 13 in the heating mode of the vehicle interior or in the heating and dehumidifying mode of the vehicle interior, the second connection line 34 may be opened by an operation of the second expansion valve 32.

That is, in the case of preventing frosting at the heat-exchanger 13 in the heating mode of the vehicle interior or in the heating and dehumidifying mode of the vehicle interior, the second expansion valve 32 may close a portion of the first connection line 31 connected to the refrigerant line 11 connecting the heat-exchanger 13 and the first expansion valve 14.

At the same time, the second expansion valve 32 may open the second connection line 34 to expand the refrigerant introduced through the second connection line 34 and introduce the expanded refrigerant to the chiller 30.

Meanwhile, in the present embodiment, the heat pump system may further include a dehumidification line 35.

A first end of the dehumidification line 35 is connected to the third expansion valve 33. A second end of the dehumidification line 35 may be connected to the refrigerant line 11 between the first expansion valve 14 and the evaporator 15.

Here, in the case of the heating and dehumidifying mode of the vehicle interior, the third expansion valve 33 may close the refrigerant line 11 connected to the heat-exchanger 13 and open the dehumidification line 35 such that the expanded refrigerant is introduced to the dehumidification line 35.

That is, in the case of the cooling mode or the heating mode of the vehicle interior, the dehumidification line 35 may be closed by the operation of the third expansion valve 33. On the other hand, in the case of the heating and dehumidifying mode of the vehicle interior, the dehumidification line 35 may be opened by the operation of the third expansion valve 33.

In the heat pump system configured as above, the first expansion valve 14 may be a mechanical expansion valve, and the second and third expansion valves 32 and 33 each may be 3-way electronic expansion valves configured to selectively expand the refrigerant while controlling flowing of the refrigerant.

Hereinafter, operation and action of a heat pump system of a vehicle according to an embodiment configured as described above is described in detail with reference to FIG. 2 to FIG. 5.

First, the operation for cooling the battery module 6 in the cooling mode of the vehicle interior is described with reference to FIG. 2.

Figure 2:
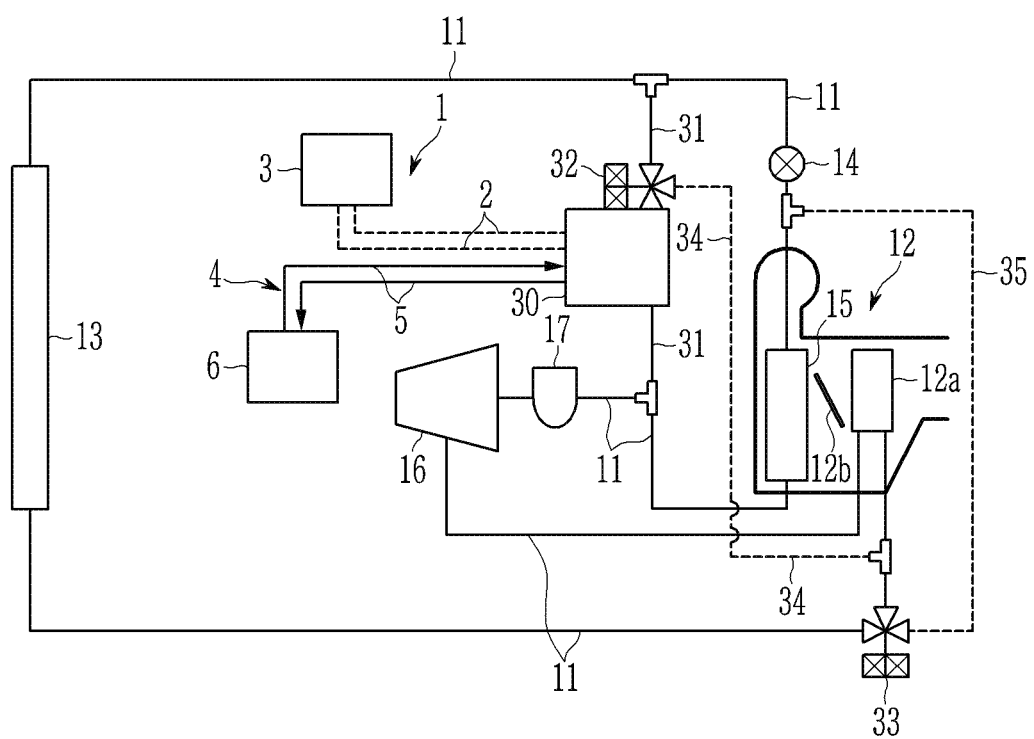
FIG. 2 is an operation diagram for cooling a battery module in a cooling mode of a vehicle interior in a heat pump system of a vehicle according to an embodiment.

FIG. 2 is an operation diagram for cooling a battery module in a cooling mode of a vehicle interior in a heat pump system of a vehicle according to an embodiment.

Referring to FIG. 2, the chiller 30 is connected to the battery module 6 through the second line 5 by an operation of the second cooling device 4.

Accordingly, the second cooling device 4 supplies the coolant to the chiller 30 through the second line 5 respectively connected to the chiller 30.

In such a state, the compressor 16 may be operated for cooling of the vehicle interior. Then, the refrigerant may circulate along the refrigerant line 11.

Here, the refrigerant line 11 connecting the heat-exchanger 13 and the evaporator 15 is opened by the operation of the first expansion valve 14. The first connection line 31 is opened by the operation of the second expansion valve 32.

At this time, the second expansion valve 32 may expand the refrigerant introduced through the first connection line 31 such that the expanded refrigerant is supplied to the chiller 30.

Meanwhile, the second connection line 34 may be closed by the operation of the second expansion valve 32.

In addition, the third expansion valve 33 may supply the refrigerant supplied from the internal condenser 12a to the heat-exchanger 13 in an unexpanded state.

That is, the third expansion valve 33 may allow the refrigerant supplied from the internal condenser 12a to pass therethrough.

Simultaneously, the dehumidification line 35 is closed by the operation of the third expansion valve 33.

Then, the refrigerant having passed through the heat-exchanger 13 may circulate along the refrigerant line 11 and the first connection line 31.

Here, the first and second expansion valves 14 and 32 may expand the refrigerant such that the expanded refrigerant is respectively supplied to the evaporator 15 and the chiller 30.

In addition, the heat-exchanger 13 may additionally condense the refrigerant introduced from the internal condenser 12a through heat-exchange with the ambient air.

Meanwhile, the coolant having passed through the chiller 30 is cooled through heat-exchange with the expanded refrigerant supplied to the chiller 30.

Accordingly, the coolant having passed through the chiller 30 may cool the battery module 6 provided in the second cooling device 4.

That is, the coolant passing through the chiller 30 is cooled through heat-exchange with the expanded refrigerant supplied to the chiller 30.

The coolant cooled at the chiller 30 is supplied to the battery module 6 along the second line 5. Accordingly, the battery module 6 may be efficiently cooled by the coolant cooled at the chiller 30.

That is, the second expansion valve 32 expands a portion of the refrigerant having passed through the heat-exchanger 13 to supply the expanded refrigerant to the chiller 30.

Therefore, a portion of the refrigerant discharged at the heat-exchanger 13 is changed to a state of low temperature and low pressure by being expanded by the operation of the second expansion valve 32 and flows to the chiller 30 provided on the first connection line 31.

Then, the refrigerant introduced into the chiller 30 heat-exchanges with the coolant and is supplied to the accumulator 17 through the refrigerant line 11 connected to the first connection line 31.

The refrigerant supplied to the accumulator 17 is separated into gas and liquid, and a gas refrigerant among the refrigerant separated into the gas and the liquid flows into the compressor 16.

Meanwhile, the remaining refrigerant discharged at the heat-exchanger 13 flows through the refrigerant line 11 to cool the vehicle interior and sequentially passes through the first expansion valve 14, the evaporator 15, the accumulator 17, the compressor 16, and the internal condenser 12a.

Here, the ambient air introduced to the HVAC module 12 is cooled by the refrigerant in the low temperature state introduced to the evaporator 15 while passing through the evaporator 15.

At this time, the opening/closing door 12b closes the region passing through the internal condenser 12a such that the cooled ambient air does not pass through the internal condenser 12a. Therefore, the cooled ambient air directly flows into the vehicle interior to cool the vehicle interior.

Meanwhile, the refrigerant is expanded and supplied to the evaporator 15 with its condensation being increased while sequentially passing through the internal condenser 12a and the heat-exchanger 13, and thereby the refrigerant may be evaporated at a lower temperature.

That is, in the present embodiment, since the internal condenser 12a and the heat-exchanger 13 respectively condense the refrigerant through heat-exchange with the ambient air, it may be beneficial to forming sub-cooling of the refrigerant.

In addition, as the refrigerant formed with sub-cooling is evaporated to a lower temperature at the evaporator 15, the temperature of the ambient air passing through the evaporator 15 may be further lowered, thereby improving the cooling performance and efficiency.

In the cooling mode of the vehicle interior, the refrigerant may cool the vehicle interior while repeating the above-described processes, and at the same time, may cool the coolant through the heat-exchange while passing through the chiller 30.

The coolant of a low temperature cooled at the chiller 30 flows to the battery module 6 through the second line 5. Accordingly, the battery module 6 may be efficiently cooled by the supplied low temperature coolant.

In the present embodiment, an operation for recollecting waste heat of an ambient air heat source and the electrical component 3 in the heating mode of the vehicle interior is described with reference to FIG. 3.

Figure 3:
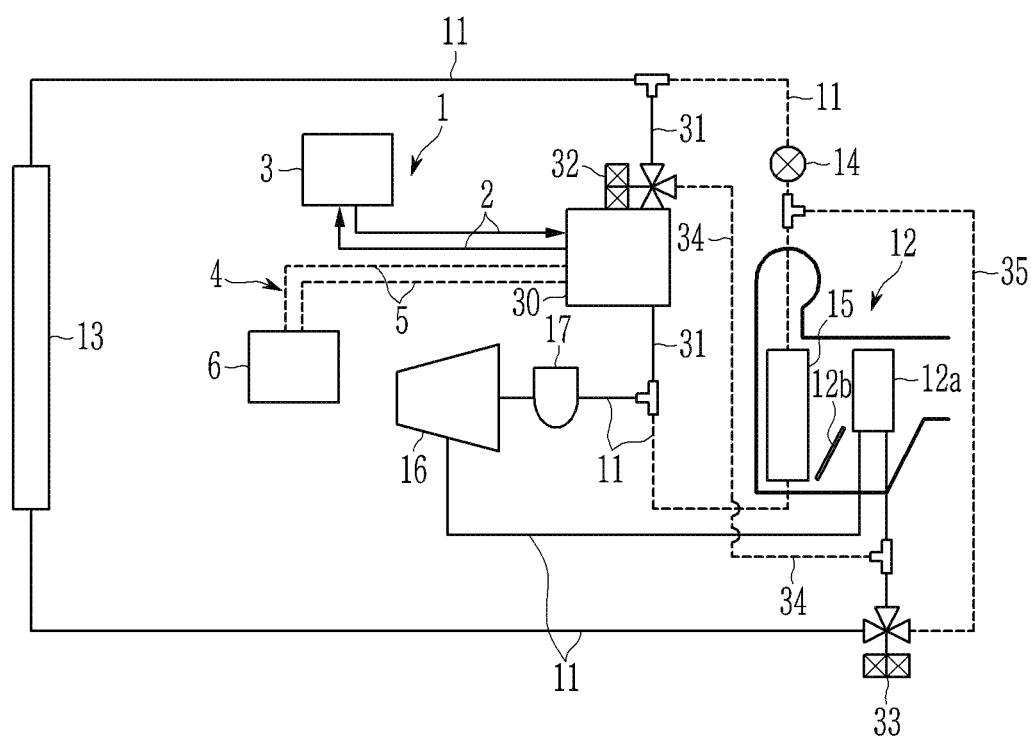
FIG. 3 is an operation diagram for recollecting waste heat of an ambient air heat source and an electrical component in a heating mode of a vehicle interior in a heat pump system of a vehicle according to an embodiment.

FIG. 3 is an operation diagram for recollecting waste heat of an ambient air heat source and an electrical component the heating mode of the vehicle interior in a heat pump system of a vehicle according to an embodiment.

Referring to FIG. 3, the chiller 30 is connected to the electrical component 3 through the first line 2 by an operation of the first cooling device 1.

Accordingly, the first cooling device 1 supplies the coolant to the chiller 30 through the first line 2 respectively connected to the chiller 30.

In such a state, the compressor 16 may be operated for heating of the vehicle interior. Then, the refrigerant may circulate along the refrigerant line 11.

Here, a portion of the refrigerant line 11 from a location connected to the first connection line 31 to a location connected to the evaporator 15 may be closed by the operation of the first expansion valve 14. Accordingly, the supply of the refrigerant to the evaporator 15 may be stopped.

Meanwhile, the first connection line 31 may be opened by the operation of the second expansion valve 32.

At this time, the second expansion valve 32 may pass through the refrigerant introduced through the first connection line 31 such that the unexpanded refrigerant is supplied to the chiller 30.

Meanwhile, the second connection line 34 is closed by the operation of the second expansion valve 32.

In addition, the third expansion valve 33 may expand the refrigerant supplied from the internal condenser 12a such that the expanded refrigerant is supplied to the heat-exchanger 13 through the refrigerant line 11.

That is, the third expansion valve 33 may expand the refrigerant supplied from the internal condenser 12a.

Simultaneously, the dehumidification line 35 is closed by the operation of the third expansion valve 33.

Then, the refrigerant having passed through the heat-exchanger 13 may circulate along the refrigerant line 11 and the first connection line 31.

Here, the heat-exchanger 13 may evaporate the expanded refrigerant supplied from the third expansion valve 33 through heat-exchange with the ambient air.

Accordingly, the heat-exchanger 13 recollects waste heat of an ambient air heat source while evaporating the expanded refrigerant through heat-exchange with the ambient air.

The refrigerant evaporated at the heat-exchanger 13 flows into the chiller 30 along the opened portion of the refrigerant line 11 and the first connection line 31.

Meanwhile, the temperature of the coolant circulating the first cooling device 1 is increased by recollecting the waste heat generated at the electrical component 3.

The coolant with the increased temperature may be supplied to the chiller 30 through the first line 2. Therefore, the waste heat generated at the electrical component 3 may increase the temperature of the refrigerant supplied to the chiller 30.

That is, the coolant with the increased temperature by absorbing the waste heat of the electrical component 3 passes through the chiller 30 along the first line 2 and is recollected while increasing the temperature of the refrigerant supplied to the chiller 30.

Accordingly, the chiller 30 may increase the temperature of the refrigerant by heat-exchange between the coolant and the refrigerant, such that the waste heat of the electrical component 3 is recollected from the coolant heated while passing through the electrical component 3.

In other words, the chiller 30 may recollect the waste heat of the electrical component 3 by heat-exchanging the refrigerant evaporated at the heat-exchanger 13 with the coolant heated while passing through the electrical component 3 and use the recollected heat for heating of the vehicle interior.

Meanwhile, the refrigerant having passed through the chiller 30 is supplied to the accumulator 17 along the first connection line 31 and the refrigerant line 11.

The refrigerant supplied to the accumulator 17 is separated into gas and liquid, and the gas refrigerant among the refrigerant separated into the gas and the liquid is supplied to the compressor 16.

That is, the refrigerant discharged from the chiller 30 flows through the first connection line 31 and the refrigerant line 11 to heat the vehicle interior and may sequentially pass through the accumulator 17, the compressor 16, and the internal condenser 12a.

In addition, the refrigerant compressed to the state of high temperature and high pressure at the compressor 16 flows to the internal condenser 12a.

Here, the opening/closing door 12b is opened such that the ambient air introduced to the HVAC module 12 and having passed through the evaporator 15 passes through the internal condenser 12a.

Accordingly, the ambient air introduced from outside is introduced in the state of the room temperature without being cooled for passing through the evaporator 15 that is not supplied with the refrigerant. The introduced ambient air may be converted into the high temperature state while passing through the internal condenser 12a and flow into the vehicle interior, thereby realizing heating of the vehicle interior.

That is, according to the heat pump system according to the present embodiment, the waste heat generated at the electrical component 3 is recollected and used for heating of the vehicle interior. Therefore, power consumption of the compressor 16 may be decreased and heating efficiency may be improved.

In the present embodiment, an operation for recollecting the waste heat of the electrical component 3 and preventing frosting of the heat-exchanger 13 in the heating mode of the vehicle interior is described with reference to FIG. 4.

Figure 4:
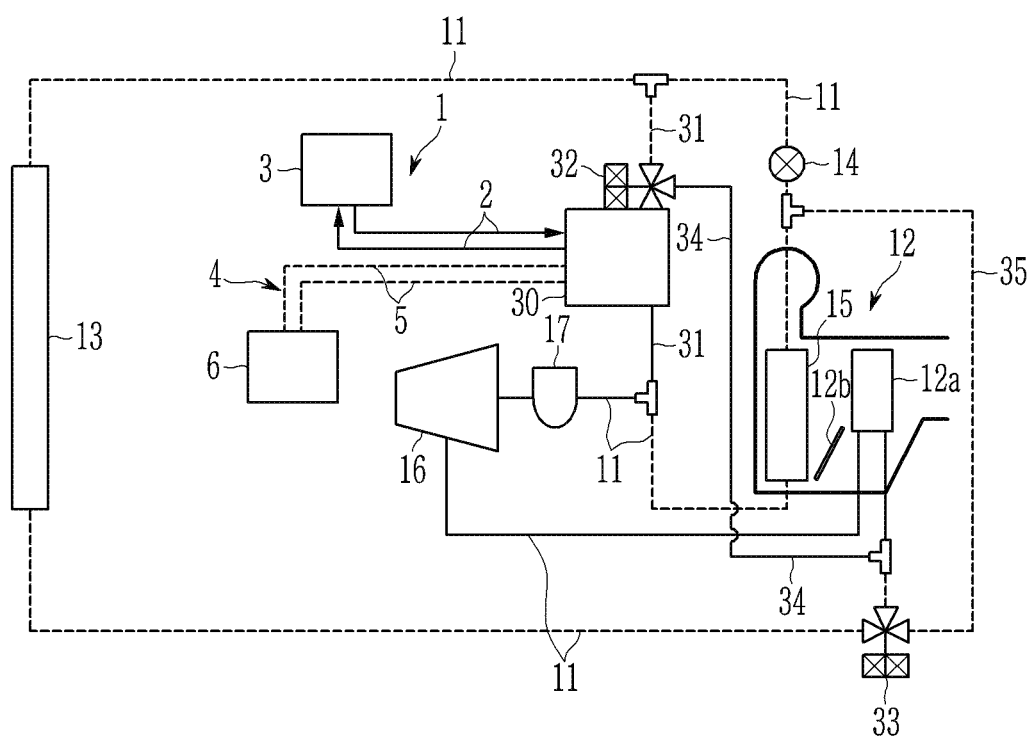
FIG. 4 is an operation diagram for recollecting waste heat of an electrical component and preventing frosting of a heat-exchanger in a heating mode of a vehicle interior in a heat pump system of a vehicle according to an embodiment.

FIG. 4 is an operation diagram for recollecting waste heat of an electrical component and preventing frosting of a heat-exchanger in the heating mode of the vehicle interior in a heat pump system of a vehicle according to an embodiment.

Referring to FIG. 4, the chiller 30 is connected to the electrical component 3 through the first line 2 by the operation of the first cooling device 1.

Accordingly, the first cooling device 1 supplies the coolant to the chiller 30 through the first line 2 respectively connected to the chiller 30.

In such a state, the compressor 16 may be operated for heating of the vehicle interior. Then, the refrigerant may circulate along the opened refrigerant line 11.

Here, the portion of the first connection line 31 connected to the refrigerant line 11 connecting the heat-exchanger 13 and the first expansion valve 14 is closed by the operation of the second expansion valve 32.

The second connection line 34 is opened by the operation of the second expansion valve 32.

Here, the second expansion valve 32 may expand the refrigerant introduced through the second connection line 34 and introduce the expanded refrigerant to the chiller 30.

In addition, the refrigerant line 11 connecting between the heat-exchanger 13 and the third expansion valve 33 is closed by the operation of the third expansion valve 33. At the same time, the dehumidification line 35 is closed by the operation of the third expansion valve 33.

That is, operation of the third expansion valve 33 may be stopped.

Then, the refrigerant at high temperature and high pressure supplied from the compressor 16 passes through the internal condenser 12*a* along the refrigerant line 11.

The refrigerant having passed through the internal condenser 12*a* flows into the second expansion valve 32 along the opened second connection line 34. The second expansion valve 32 may expand the refrigerant supplied from the internal condenser 12*a* through the second connection line 34 and may pass the expanded refrigerant to the chiller 30.

Meanwhile, the temperature of the coolant circulating the first cooling device 1 is increased by recollecting the waste heat generated at the electrical component 3.

The coolant with the increased temperature may be supplied to the chiller 30 through the first line 2. Therefore, the waste heat generated at the electrical component 3 may increase the temperature of the refrigerant supplied to the chiller 30.

That is, the coolant with the temperature increased by absorbing the waste heat of the electrical component 3 passes through the chiller 30 along the first line 2 and is recollected while increasing the temperature of the refrigerant supplied to the chiller 30.

Accordingly, the chiller 30 may increase the temperature of the refrigerant by heat-exchange between the coolant and the refrigerant, such that the waste heat of the electrical component 3 is recollected from the coolant heated while passing through the electrical component 3.

In other words, the chiller 30 may recollect the waste heat of the electrical component 3 by heat-exchanging the refrigerant evaporated at the heat-exchanger 13 with the coolant heated while passing through the electrical component 3 and use the recollected heat for heating of the vehicle interior.

Meanwhile, the refrigerant having passed through the chiller 30 is supplied to the accumulator 17 along the portion of the first connection line 31 and the refrigerant line 11.

The refrigerant supplied to the accumulator 17 is separated into gas and liquid, and the gas refrigerant among the refrigerant separated into the gas and the liquid is supplied to the compressor 16.

The refrigerant compressed to the state of high temperature and high pressure at the compressor 16 flows to the internal condenser 12*a*.

Here, the opening/closing door 12*b* is opened such that the ambient air introduced to the HVAC module 12 and having passed through the evaporator 15 passes through the internal condenser 12*a*.

Accordingly, the ambient air introduced from outside is introduced in the state of the room temperature without being cooled for passing through the evaporator 15 that is not supplied with the refrigerant. The introduced ambient air may be converted into the high temperature state while passing through the internal condenser 12*a* and flow into the vehicle interior, thereby realizing heating of the vehicle interior.

That is, according to the heat pump system according to the present embodiment, the waste heat generated at the electrical component 3 is recollected and used for heating of the vehicle interior. Therefore, power consumption of the compressor 16 may be decreased and heating efficiency may be improved.

In addition, according to the heat pump system, the refrigerant is prevented from flowing into the heat-exchanger 13 when the outside temperature is low, and therefore, frost accumulation on the heat-exchanger 13 due to frosting and freezing at the time of heat-exchanging between the refrigerant and the ambient air may be prevented.

In the present embodiment, an operation for recollecting waste heat of an ambient air heat source and the electrical component 3 in the heating and dehumidifying mode of the vehicle interior is described with reference to FIG. 5.

Figure 5:
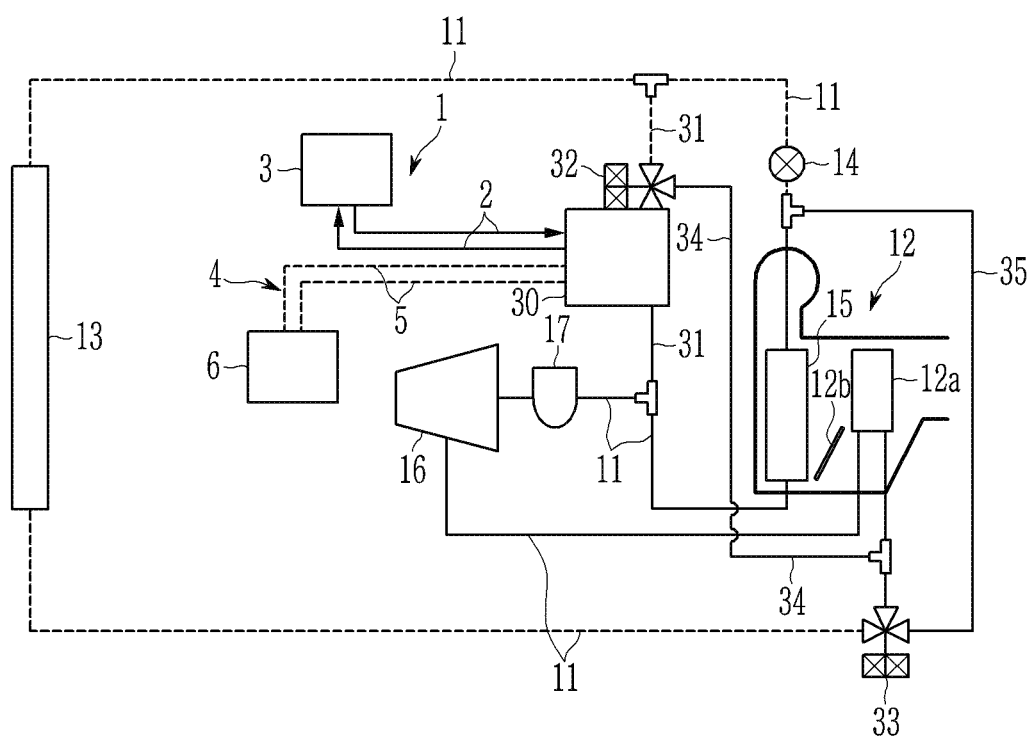
FIG. 5 is an operation diagram for recollecting waste heat of an ambient air heat source and an electrical component in a heating and dehumidifying mode of a vehicle interior in a heat pump system of a vehicle according to an embodiment.

FIG. 5 is an operation diagram for recollecting waste heat of an ambient air heat source and an electrical component in the heating and dehumidifying mode of the vehicle interior in a heat pump system of a vehicle according to an embodiment.

Referring to FIG. 5, the chiller 30 is connected to the electrical component 3 through the first line 2 by the operation of the first cooling device 1.

Accordingly, the first cooling device 1 supplies the coolant to the chiller 30 through the first line 2 respectively connected to the chiller 30.

In such a state, the compressor 16 may be operated for heating of the vehicle interior. Then, the refrigerant may circulate along the opened refrigerant line 11.

Here, the refrigerant line 11 connecting the heat-exchanger 13 and the first expansion valve 14 is closed by the operation of the first expansion valve 14.

In addition, the portion of the first connection line 31 connected to the refrigerant line 11 connecting the heat-exchanger 13 and the first expansion valve 14 is closed by the operation of the second expansion valve 32.

The second connection line 34 is opened by the operation of the second expansion valve 32.

Here, the second expansion valve 32 may expand the refrigerant introduced through the second connection line 34 and introduce the expanded refrigerant to the chiller 30.

In addition, the refrigerant line 11 connecting the heat-exchanger 13 and the third expansion valve 33 is closed by the operation of the third expansion valve 33. At the same time, the dehumidification line 35 is opened by the operation of the third expansion valve 33.

Here, the third expansion valve 33 may expand the refrigerant and pass the expanded refrigerant to the dehumidification line 35.

That is, a portion of refrigerant among the refrigerant discharged from the internal condenser 12a may flow along the opened second connection line 34, and the remaining refrigerant may flow along the dehumidification line 35 in the state expanded at the third expansion valve 33.

Then, the refrigerant at high temperature and high pressure supplied from the compressor 16 passes through the internal condenser 12a along the refrigerant line 11.

The portion of the refrigerant among the refrigerant having passed through the internal condenser 12a flows into the second expansion valve 32 along the opened second connection line 34. The second expansion valve 32 may expand the refrigerant supplied from the internal condenser 12a through the second connection line 34 and may pass the expanded refrigerant to the chiller 30.

Here, the temperature of the coolant circulating the first cooling device 1 is increased by recollecting the waste heat generated at the electrical component 3.

The coolant with the increased temperature may be supplied to the chiller 30 through the first line 2. Therefore, the waste heat generated at the electrical component 3 may increase the temperature of the refrigerant supplied to the chiller 30.

That is, the coolant with the temperature increased by absorbing the waste heat of the electrical component 3 passes through the chiller 30 along the first line 2 and is recollected while increasing the temperature of the refrigerant supplied to the chiller 30.

Accordingly, the chiller 30 may increase the temperature of the refrigerant by heat-exchange between the coolant and the refrigerant, such that the waste heat of the electrical component 3 is recollected from the coolant heated while passing through the electrical component 3.

In other words, the chiller 30 may recollect the waste heat of the electrical component 3 by heat-exchanging the refrigerant evaporated at the heat-exchanger 13 with the coolant heated while passing through the electrical component 3 and use the recollected heat for heating of the vehicle interior.

Meanwhile, the expanded refrigerant expanded by the operation of the third expansion valve 33 may flow along the dehumidification line 35 and may be supplied to the evaporator 15 through the refrigerant line 11 connected to the evaporator 15.

The refrigerant having passed through the evaporator 15 is supplied to the compressor 16 after passing through the accumulator 17 along the refrigerant line 11.

That is, the expanded refrigerant is supplied to the evaporator 15 through the dehumidification line 35. At this time, the evaporator 15 recollects waste heat of an ambient air heat source while evaporating the expanded refrigerant through heat-exchange with the ambient air introduced into the HVAC module 12.

Meanwhile, the refrigerant having passed through the chiller 30 is supplied to the accumulator 17 along the portion of the first connection line 31 and the refrigerant line 11.

In addition, the refrigerant having passed through the evaporator 15 may be supplied to the accumulator 17 along the refrigerant line 11.

The refrigerant supplied to the accumulator 17 is separated into gas and liquid, and the gas refrigerant among the refrigerant separated into the gas and the liquid is supplied to the compressor 16.

The refrigerant compressed to the state of high temperature and high pressure at the compressor 16 flows to the internal condenser 12a.

Here, the refrigerant supplied to the internal condenser 12a may increase the temperature of the ambient air introduced to the HVAC module 12.

The opening/closing door 12b is opened such that the ambient air introduced to the HVAC module 12 and having passed through the evaporator 15 passes through the internal condenser 12a.

That is, the ambient air introduced to the HVAC module 12 is dehumidified while passing through the evaporator 15 by the refrigerant in the low temperature state introduced to the evaporator 15. Then, the introduced ambient air may be converted into the high temperature state while passing through the internal condenser 12a and may flow into the vehicle interior, thereby heating and dehumidifying the vehicle interior smoothly.

That is, according to the heat pump system according to the present embodiment, the waste heat of the ambient air heat source is recollected by the evaporator 15, the waste heat generated at the electrical component 3 is recollected by the chiller 30, and the recollected heat is used for heating of the vehicle interior. Therefore, power consumption of the compressor 16 may be decreased and heating efficiency may be improved.

Therefore, according to a heat pump system of a vehicle according to an embodiment, the temperature of the battery module 6 may be adjusted according to the vehicle mode by using the single chiller 30 providing heat-exchange between the coolant and the refrigerant, and the waste heat generated by an ambient air heat source and the electrical component 3 may be recollected and used for heating of the vehicle interior, thereby improving the overall efficiency of the system.

In addition, according to embodiments of the disclosure, the single heat-exchanger 13 that condenses or evaporates the refrigerant through heat-exchange with the ambient air according to the cooling mode or the heating mode of the vehicle is employed, and frost accumulation on the heat-exchanger due to frosting and freezing according to the ambient air temperature is prevented. Accordingly, streamlining and simplification of the system may be achieved and marketability may be improved.

In addition, according to an embodiment, by efficiently adjusting the temperature of the battery module 6, the optimal performance of the battery module 6 may be enabled, and the overall travel distance of the vehicle may be increased due to the efficient management of the battery module 6.

In addition, according to an embodiment, condensation or evaporation performance of the refrigerant is improved by employing the heat-exchanger 13 that condenses or evaporates the refrigerant through heat-exchange with ambient air, and therefore, the cooling performance may be improved while the power consumption of the compressor is decreased.

In addition, according to an embodiment, it is possible to reduce manufacturing cost and weight through simplification of an entire system and to improve space utilization.

While embodiments of the invention have been described in connection with what are presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system of a vehicle, the heat pump system comprising:
   a first cooling device comprising an electrical component and a first line, the first cooling device being configured to circulate a coolant through the first line;
   a second cooling device comprising a battery module and a second line, the second cooling device being configured to circulate the coolant through the second line;
   an HVAC module connected through a refrigerant line and internally provided with an opening/closing door configured to adjust a selective flow of ambient air having passed through an evaporator to an internal condenser according to a cooling mode, a heating mode, or a heating and dehumidifying mode of a vehicle interior;
   a heat-exchanger connected to the internal condenser through the refrigerant line;
   a first expansion valve provided on the refrigerant line and connecting the heat-exchanger and the evaporator;
   a compressor connected between the evaporator and the internal condenser through the refrigerant line;
   an accumulator provided on the refrigerant line between the evaporator and the compressor;
   a chiller connected to the first cooling device and the second cooling device through the first line and the second line, respectively, connected to the refrigerant line through a first connection line, and configured to adjust a temperature of the coolant by heat-exchanging a selectively introduced coolant with a refrigerant supplied from the first connection line;
   a second expansion valve provided on the first connection line upstream of the chiller;
   a third expansion valve provided on the refrigerant line between the internal condenser and the heat-exchanger; and
   a second connection line having a first end connected to the second expansion valve and a second end connected to the refrigerant line between the internal condenser and the third expansion valve.

2. The heat pump system of claim 1, wherein:
   a first end of the first connection line is connected to the refrigerant line between the heat-exchanger and the first expansion valve; and
   a second end of the first connection line is connected to the refrigerant line between the accumulator and the evaporator.

3. The heat pump system of claim 1, wherein, in order to cool the battery module using the coolant having heat-exchanged at the chiller, the second expansion valve is configured to expand the refrigerant introduced through the first connection line and introduce the expanded refrigerant to the chiller.

4. The heat pump system of claim 1, wherein, in order to prevent frosting at the heat-exchanger in the heating mode of the vehicle interior or in the heating and dehumidifying mode of the vehicle interior, the second expansion valve is configured to operate to open the second connection line.

5. The heat pump system of claim 1, wherein in order to prevent frosting at the heat-exchanger in the heating mode of the vehicle interior or in the heating and dehumidifying mode of the vehicle interior, the second expansion valve is configured to close a portion of the first connection line connected to the refrigerant line connecting the heat-exchanger and the first expansion valve, open the second connection line, and expand the refrigerant introduced through the second connection line to introduce the expanded refrigerant to the chiller.

6. The heat pump system of claim 1, wherein, in the cooling mode of the vehicle interior, the third expansion valve is configured to introduce the refrigerant supplied from the internal condenser to the refrigerant line without expansion.

7. The heat pump system of claim 1, wherein, in order to cool the battery module in the cooling mode of the vehicle interior:
   the second cooling device is configured to operate to connect the battery module and the chiller through the second line;
   the second expansion valve is configured to operate to open the first connection line and to close the second connection line;
   the compressor is configured to operate to circulate the refrigerant along the refrigerant line;
   the second expansion valve is configured to expand the refrigerant introduced through the first connection line such that the expanded refrigerant is supplied to the chiller;
   the third expansion valve is configured to allow the refrigerant supplied from the internal condenser to pass through; and
   the heat-exchanger is configured to condense the supplied refrigerant through heat-exchange with the ambient air.

8. The heat pump system of claim 1, wherein, in order to collect waste heat of an ambient air heat source and the electrical component in the heating mode of the vehicle interior:
   the first cooling device is configured to operate to connect the electrical component and the chiller through the first line;
   the first expansion valve is configured to operate to close a portion of the refrigerant line from a location connected to the first connection line to a location connected to the evaporator;
   the second expansion valve is configured to operate to open the first connection line and to close the second connection line;
   the compressor is configured to operate to open the refrigerant line and to circulate the refrigerant along the refrigerant line;
   the second expansion valve is configured to allow the refrigerant introduced through the first connection line to pass through;
   the third expansion valve is configured to expand the refrigerant supplied from the internal condenser such that the expanded refrigerant is supplied to the heat-exchanger through the refrigerant line; and
   the heat-exchanger is configured to evaporate the supplied refrigerant through heat-exchange with the ambient air.

9. The heat pump system of claim 1, wherein, in order to prevent frosting at the heat-exchanger in the heating mode of the vehicle interior:
   the first cooling device is configured to operate to connect the electrical component and the chiller through the first line;
   the first expansion valve is configured to operate to close the refrigerant line connecting the heat-exchanger and the first expansion valve;
   the second expansion valve is configured to operate to close a portion of the first connection line connected to the refrigerant line connecting the heat-exchanger and the first expansion valve and to open the second connection line;

the third expansion valve is configured to operate to close the refrigerant line between the heat-exchanger and the third expansion valve;

the compressor is configured to operate to open the refrigerant line to circulate the refrigerant along the refrigerant line;

the second expansion valve is configured to expand the refrigerant introduced through the second connection line and to introduce the expanded refrigerant to the chiller; and the third expansion valve is configured to stop an operation thereof.

10. The heat pump system of claim 1, wherein the second expansion valve and the third expansion valve each comprise a 3-way electronic expansion valve configured to selectively expand the refrigerant while controlling a flow of the refrigerant, respectively.

11. The heat pump system of claim 1, wherein the heat-exchanger is configured to condense or evaporate an interiorly introduced refrigerant through heat-exchange with the ambient air according to a selective operation of the third expansion valve.

12. The heat pump system of claim 1, wherein:
the chiller comprises a water-cooled heat-exchanger; and
the heat-exchanger comprises an air-cooled heat-exchanger.

13. A heat pump system of a vehicle, the heat pump system comprising:
a first cooling device comprising an electrical component and a first line, the first cooling device being configured to circulate a coolant through the first line;
a second cooling device comprising a battery module and a second line, the second cooling device being configured to circulate the coolant through the second line;
an HVAC module connected through a refrigerant line and internally provided with an opening/closing door configured to adjust a selective flow of ambient air having passed through an evaporator to an internal condenser according to a cooling mode, a heating mode, or a heating and dehumidifying mode of a vehicle interior;
a heat-exchanger connected to the internal condenser through the refrigerant line;
a first expansion valve provided on the refrigerant line and connecting the heat-exchanger and the evaporator;
a compressor connected between the evaporator and the internal condenser through the refrigerant line;
an accumulator provided on the refrigerant line between the evaporator and the compressor;
a chiller connected to the first cooling device and the second cooling device through the first line and the second line, respectively, connected to the refrigerant line through a first connection line, and configured to adjust a temperature of the coolant by heat-exchanging a selectively introduced coolant with a refrigerant supplied from the first connection line;
a second expansion valve provided on the first connection line upstream of the chiller;
a third expansion valve provided on the refrigerant line between the internal condenser and the heat-exchanger;
a second connection line having a first end connected to the second expansion valve and a second end connected to the refrigerant line between the internal condenser and the third expansion valve; and a dehumidification line having a first end connected to the third expansion valve and a second end connected to the refrigerant line between the first expansion valve and the evaporator.

14. The heat pump system of claim 13, wherein, in the heating and dehumidifying mode of the vehicle interior, the third expansion valve is configured to close the refrigerant line connected to the heat-exchanger and to open the dehumidification line such that an expanded refrigerant is introduced to the dehumidification line.

15. The heat pump system of claim 13, wherein the third expansion valve is configured to operate to:
close the dehumidification line in the cooling mode or the heating mode of the vehicle interior; and
to open the dehumidification line in the heating and dehumidifying mode of the vehicle interior.

16. The heat pump system of claim 13, wherein, in the heating and dehumidifying mode of the vehicle interior:
the first cooling device is configured to operate to connect the electrical component and the chiller through the first line;
the first expansion valve is configured to operate to close the refrigerant line connecting the heat-exchanger and the first expansion valve;
the second expansion valve is configured to operate to close a portion of the first connection line connected to the refrigerant line connecting the heat-exchanger and the first expansion valve;
the third expansion valve is configured to operate to close the refrigerant line connecting the heat-exchanger and the third expansion valve;
the second expansion valve is configured to operate to open the second connection line;
the third expansion valve is configured to operate to open the dehumidification line;
the compressor is configured to operate to open the refrigerant line to circulate the refrigerant along the refrigerant line; and
the second expansion valve and the third expansion valve are each configured to expand the refrigerant, respectively.

17. The heat pump system of claim 13, wherein the second expansion valve and the third expansion valve each comprise a three-way electronic expansion valve configured to selectively expand the refrigerant while controlling a flow of the refrigerant, respectively.

18. The heat pump system of claim 13, wherein the heat-exchanger is configured to condense or evaporate an interiorly introduced refrigerant through heat-exchange with the ambient air according to a selective operation of the third expansion valve.

19. The heat pump system of claim 13, wherein:
the chiller comprises a water-cooled heat-exchanger; and
the heat-exchanger comprises an air-cooled heat-exchanger.

20. A method of providing a heat pump system of a vehicle, the method comprising:
providing a first cooling device comprising an electrical component and a first line through which a coolant circulates;
providing a second cooling device comprising a battery module and a second line through which the coolant circulates;
providing an HVAC module connected through a refrigerant line and internally provided with an opening/closing door that adjusts a selective flow of ambient air having passed through an evaporator to an internal condenser according to a cooling mode, a heating mode, or a heating and dehumidifying mode of a vehicle interior;

providing a heat-exchanger connected to the internal condenser through the refrigerant line;

providing a first expansion valve on the refrigerant line connecting the heat-exchanger and the evaporator;

providing a compressor connected between the evaporator and the internal condenser through the refrigerant line;

providing an accumulator on the refrigerant line between the evaporator and the compressor;

providing a chiller connected to the first cooling device and the second cooling device through the first line and the second line, respectively, and connected to the refrigerant line through a first connection line, wherein the chiller adjusts a temperature of the coolant by heat-exchanging a selectively introduced coolant with a refrigerant supplied from the first connection line;

providing a second expansion valve on the first connection line upstream of the chiller;

providing a third expansion valve on the refrigerant line between the internal condenser and the heat-exchanger; and providing a second connection line having a first end connected to the second expansion valve and a second end connected to the refrigerant line between the internal condenser and the third expansion valve.

* * * * *